(12) United States Patent
Burke et al.

(10) Patent No.: US 6,233,235 B1
(45) Date of Patent: May 15, 2001

(54) PACKET TELEPHONY POWER MANAGEMENT

(75) Inventors: Timothy M. Burke, Norton, MA (US); Richard J. Corrigan, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/430,898

(22) Filed: Nov. 1, 1999

(51) Int. Cl.$^7$ ................................................. H04L 12/28
(52) U.S. Cl. .......................... 370/356; 370/401; 725/130
(58) Field of Search ................................. 725/33, 34, 35, 725/130, 150; 370/352, 465, 401, 356, 486, 487; 379/93.09

(56) References Cited

U.S. PATENT DOCUMENTS

| | | | |
|---|---|---|---|
| 3,848,193 | * | 11/1974 | Martin et al. ........................... 725/35 |
| 5,764,734 | * | 6/1998 | Medendorp et al. ................. 725/130 |
| 5,881,361 | * | 3/1999 | Mannette et al. ..................... 725/148 |
| 6,011,548 | * | 1/2000 | Thacker ................................. 370/487 |
| 6,049,826 | * | 4/2000 | Beser ..................................... 370/401 |

* cited by examiner

Primary Examiner—Chau Nguyen
Assistant Examiner—Phuongchau Ba Nguyen
(74) Attorney, Agent, or Firm—Joanne N. Pappas; Romi N. Bose

(57) ABSTRACT

A system (10) and method for packet telephony power management of a cable distribution network (20), i.e., a hybrid fiber coax (HFC) communication system, for internet protocol (IP) packet telephony information between multiple cable modem subscriber units (16,18) communicated over a public switch telephone network (PSTN) (32) with at least one router (28), e.g., a cable modem termination system (CMTS) on a communication network backbone. Power management is provided to minimize power consumption on the IP telephony distribution system (10) supporting line-powered cable-modem subscriber units (16). The power saving techniques are supported using a virtual broadcast channel (VBC) (62) provided in the packet telephony system using an alert queue (60). The alert queue (60) is established and segmented into a plurality of phases for selective activation, each phase having memory buffers for buffering packet telephony information communicated via the CMTSs (28). The multiple cable modem subscriber units (16,18) are divided into a plurality of alert phase groups, each alert phase group being associated with one of the plurality of phases of the alert queue. The VBC (62) may then be provided between the CMTS (28) and the subscriber units (16,18) for transmitting control information.

22 Claims, 8 Drawing Sheets

PACKET TELEPHONY POWER MANAGEMENT

FIELD OF THE INVENTION

The present invention relates generally to minimizing power consumption in a communications system, and more particularly to power management for packet telephony information between multiple subscriber units communicated over a public switch telephone network with at least one router on a communications network backbone of a hybrid fiber coax (HFC) cable distribution network.

BACKGROUND OF THE INVENTION

Several cable telephony systems have been proposed for combining telephony, video, and data information over a cable distribution network taking advantage of the existing high bandwidth capabilities of cable television (CATV) operators which have an existing HFC distribution network to subscriber premises that could carry such diverse services. The goal of internet protocol (IP) telephony employing cable modem technology is to combine telephony, video, and data signals over a cable distribution infrastructure.

A primary goal of the various proposed cable telephony systems is to provide backwards compatibility with the existing telephone system infrastructure. Among other things, this requires that a subscriber to a cable telephony system be able to plug their existing telephone unit into the cable telephony system and have it operate in the same manner of operation as that provided by the public switched telephone network (PSTN). However, this basic requirement presents a significant number of issues to the design of the cable subscriber unit, e.g., existing telephones are presently powered through the telephone line provided by the PSTN, as opposed to the premise powered television units which are employed by subscribers to the cable distribution network. The line powered subscriber unit is an important component of the existing PSTN, which provides a so-called lifeline feature that allows a subscriber to make an emergency telephone call even when the premise power is down. Accordingly, whereas conventional packet telephony systems require the subscriber unit to be always powered on and listening, which results in maximum power consumption, it would be desirable to allow a subscriber unit to implement power saving techniques. A low power consumption packet telephony subscriber unit may therefore be line powered, enabling the lifeline packet telephony service.

The most conventional existing telephone service, sometimes referred to as "plain old telephone service" (POTS) requires the operator to provide loop current, i.e., 24 VDC at 25 mA, when the subscribers' telephone is in an off-hook state. If one multiplies the POTS power requirement by the potential number of subscribers in a cable telephony system however, the power management problem is significant. This problem is especially acute because existing cable television systems are not designed to handle such power distribution requirements and are not required to provide power to any subscriber equipment Whereas some power management concepts, such as providing a sleep mode and periodic broadcast channels, are employed in various wireless telephony systems and some cable distribution networks employing time division multiple access (TDMA) circuit-oriented systems providing periodic data transmissions, the problem is not so readily understood or overcome in an IP telephony environment in which data packets are communicated on an asynchronous basis by the nature of the internet infrastructure.

Cable telephony subscriber units employ a radio frequency (RF) transceiver which needs to be powered for access to the network, and thus to provide the lifeline feature discussed above, the RF transceiver must be powered by the cable distribution network which would constantly draw power, even while the subscriber unit is in the idle mode. The present cable power system cannot provide the necessary power required for the idle mode and would fail if a large number of subscriber units were active at the same time. A solution is to increase the power provided by the headend of the cable system to provide adequate power at the subscriber premise, or else provide premise powered subscriber units with battery back up for emergencies. The former requires a substantial redesign of the cable system to assure the voltages at the various subscriber premises, while the latter does not meet the goal of having the cable telephony system backwards compatible with existing telephone units.

Accordingly, it would be desirable to provide packet telephony power management of the cable distribution network for IP telephony between multiple subscriber units on a cable distribution network for packet telephony information between multiple subscriber units communicated over a public switch telephone network with at least one router on a communications network backbone.

BRIEF DESCRIPTION OF THE DRAWINGS

The novel features believed characteristic of the invention are set forth in the appended claims. The invention itself, however, as well as the preferred mode of use, further objectives and advantages thereof, is best understood by reference to the following detailed description of the embodiments in conjunction with the accompanying drawings, wherein:

DETAILED DESCRIPTION OF THE EMBODIMENTS

Figure 1:
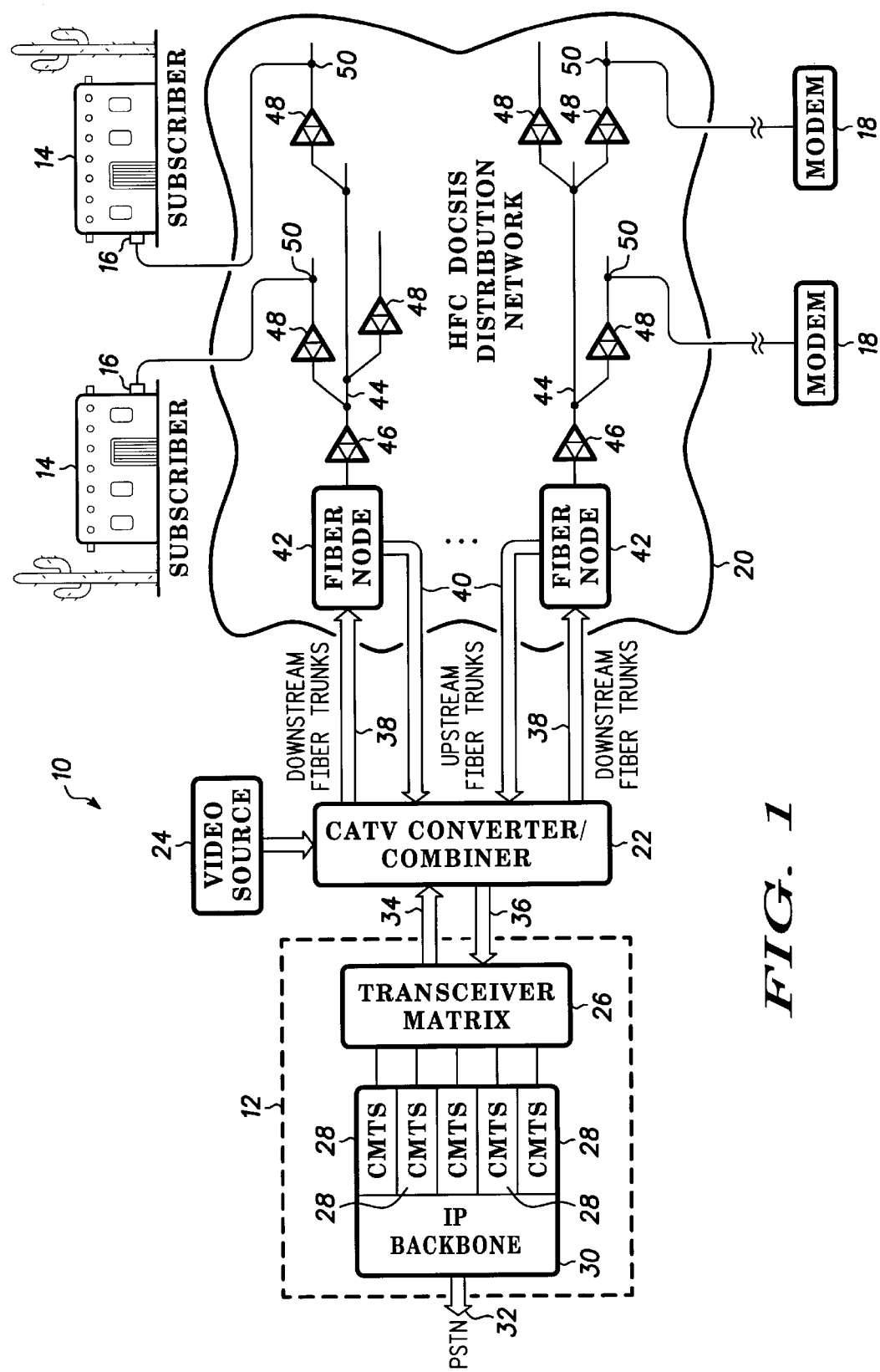
FIG. 1 is a diagram of a communications system in accordance with the present invention.

Reference will now be made in detail to the present embodiments of the invention. As depicted in FIG. 1, a communications system 10 shows a cable telephone system in block diagram form which employs coaxial cable for standard cable television (CATV) connected to subscriber premises. The communication system 10 allows multiple subscribers to access IP telephony on demand. The following description begins with an overview of the communication system 10, describing the operation of the headend backbone and routers, i.e., cable modem termination system (CMTS) 28 which is located at the cable company headend, and then the electronics in the cable modem unit, i.e., packet cable access unit (PCAU) 16 and/or a desktop cable modem 18 which would be located at the subscriber premises, e.g., a home or business. A communication system 10 as described, employs methods of packet telephony power management of a cable distribution network 20 for packet telephony information between multiple subscriber units 16,18 communicated over a public switch telephone network (PSTN) 32 with at least one router, e.g., CMTS 28 on a IP backbone 30.

The communication system 10 is an example of a basic cable system architecture which employs a hybrid fiber coax (HFC) cable system using a combination of fiber and coaxial cable to distribute information services to subscriber units at the customer premises. Of course, alternate embodiments of the communication system 10 may incur other suitable communications medium as part of the distribution network.

The communication system 10 uses an IP multicast protocol or multicast backbone (MBONE) using a collection of internet routers which support IP multicasting for audio and video across the internet. The internet routers, herein provided as CMTS 28, establish a virtual broadcast channel (VBC) broadcast system as discussed below for transmitting parameter information to the subscriber unit 16 allowing for the implementation of power saving techniques. An alert queue is established which is segmented into a plurality of phases for selective activation, each phase having memory buffers for buffering packet telephony information communicated via the router. The multiple subscribers units are divided into a plurality of alert phase groups, and each alert phase group is associated with one of the plurality of phases of the alert queue. A virtual broadcast channel (VBC) may then be provided between the router and the multiple subscriber units for transmitting control information. An alert phase method is used for PCAU 16 to facilitate a sleep mode, which may or may not be required for all clients. Secondary registration is used to identify clients that facilitate the sleep mode and enable them to participate in the power-saving protocol. The serving area is partitioned into subnets and an alert queue is employed for selective power management of the subscriber units 16,18.

The communication system 10 includes a headend 12 as a base communications unit which is connected to subscribers 14 by a distribution network 20 and a combiner 22. The headend 12 is typically located at the cable company headquarters for sending and receiving telephone calls to and from the home subscribers 14.

The combiner 22 is a cable television (CATV) converter/combiner which also has an input for video broadcast sources 24. The headend 12 also includes a transceiver matrix 26 and cable modem termination systems (CMTSs) 28, which are connected to the combiner 22, and controlled with an IP backbone controller 30. The CATV converter and combiner 22 combines a CATV video signal or television broadcast signal from video source 24 and a plurality of telephone signals, herein IP telephony packet data from the CMTS 28. The combiner 22 strips off the upstream telephone data signals from the house 14 which are headed to the public switch telephone network (PSTN) 32 which also provides a plurality a downstream telephone signals 34. A plurality of upstream telephone signals 36 are connected to the CMTS 28 through the transceiver matrix 26 which connects the telephone signals with the appropriate CMTS 28 which are interfaced with the PSTN through the IP backbone 30. The CMTS 28 generates downstream carrier channels in the communication system 10 serving various sections of the distribution network 20. The downstream link 34 includes the radio frequency (RF) signals going to the subscriber homes 14. The upstream links 36 include the RF signals from the subscriber unit 16,18 to the headend 12 which are also processed by an associated CMTS 28.

Modulated RF carrier signals received from the video source 24 and the CMTS 28 in the headend 12 are summed in the combiner 22 which sends the modulated RF signals over the distribution network 20, herein a hybrid fiber coax (HFC) data over cable service interface specification (DOCSIS) distribution network which provides network interfaces for the communication system 10 allowing bidirectional transfer of IP traffic between the cable system headend 12 and the subscriber premises 14, over a cable television system. DOCSIS provides a set of specifications which address defined portions of the communication system 10 operation which addresses the system requirements for high speed data over cable systems as discussed herein.

The data over cable system 10 facilitates communication between the CMTS 36 and one or more cable modems 16,18 in accordance with the DOCSIS specifications. The CMTSs 28 are connected to the IP backbone 30 which provides all functions necessary to support the data link portion of the system 10. The data link portion refers to the ability of the system 10 to carry telephone calls in the form of IP data, as well as any other communications in the form of digital data. A digital switch and associated packet-to-circuit gateway device to the PSTN 32 may be in a remote location from the headend 12, or may be located at the headend 12. The headend equipment provides access and management of services for the system 10 servicing multiple subscribers. The IP backbone 30 of the headend 12 is coupled to the PSTN 32 through digital carrier facilities such as T1 or E1 digital switch services and associated packet-to-circuit gateway device.

Transmissions from the CMTS 28 in the distribution network 20 are facilitated by downstream fiber trunk 38 and upstream fiber trunk 40, which are fiber optic cables and are connected to fiber nodes 42. The fiber nodes 42 perform directional conversion between the optical domain of fiber optical cable and the electrical domain of coaxial cable in the distribution network 20. Each fiber node 42 has a connection to at least one serving area 44, which includes coaxial cable and trunk amplifiers 46. The trunk amplifiers 46 are bidirectional amplifiers, and additionally bidirectional line extenders 48 are located near taps 50, which are connected to the subscriber unit which may include packet cable access units (PCAUs) 16 located on the subscriber home 14, or cable modems such as desktop modem 18 which may be located within the subscriber premises.

The headend 12 is used to provide telephony, as well as other digital data communications, in the communication system 10. Additionally, the headend 12 controls the cable spectrum, infrastructure, resources such as power control, and services for all cable modems on the serving area, as well as managing multiple serving areas. The cable modem employed, may or may not provide the desired power management techniques discussed below, and the CMTS 28 of the headend 12 facilitates dual registration allowing for subscriber units, e.g., unit 16, for use with power management, as well as registration of nonpower management units, e.g., desktop modem 18, under control of the headend 12. Typically, the PCAU 16 is mounted on the side of the subscriber's home 14, or on an unintrusive place, such as a basement or attic. The PCAU 16 manages the uplink and downlink communication paths and transports cable television channels to the subscriber's television. For example, POTS telephone units may be operated through the subscriber's home connectors coupled to the PCAU 16. The PCAU 16 manages the telephone signals of POTS on the cable system, and takes telephone signals from the cable system and forwards the calls to the POTS units on the system 10.

A PCAU or other client device implementing the herein mentioned power-saving protocol would undergo a dual registration process. The first registration would occur between PCAU 16 and the MGCP server 58, thus informing the network that it is capable of supporting IP telephony. The second registration would occur between PCAU 16 and the VBC server 56, thus informing the network that it is capable of supporting the power-saving protocol.

Figure 2:
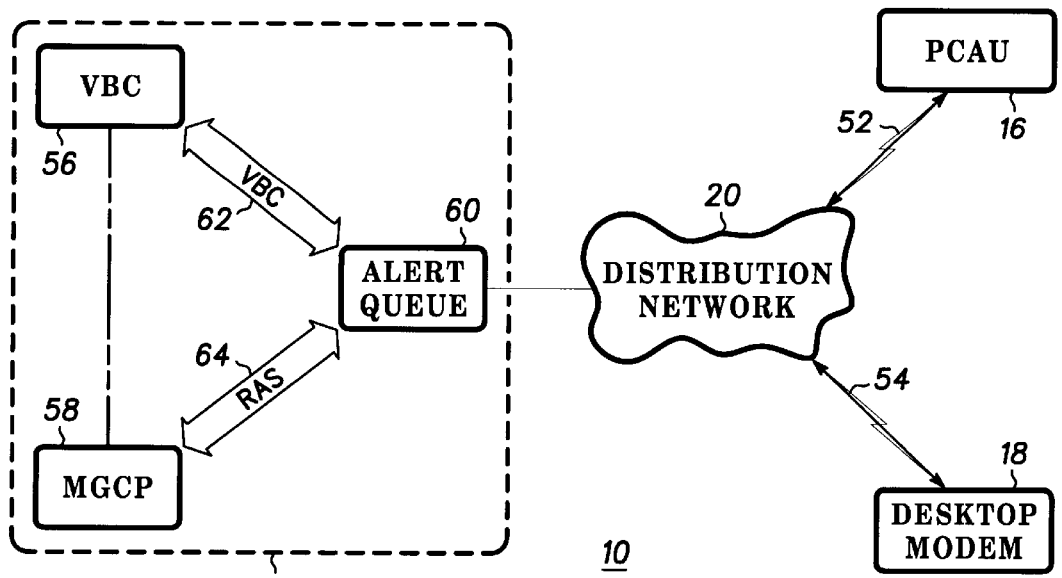
FIG. 2 illustrates the establishment of information channels for dual registration of various cable modem subscriber units over the cable distribution network with a cable modem termination system (CMTS)

FIG. 2 illustrates the dual registration of power management compatible modems such as the PCAU 16, with noncompatible modems, e.g., desktop modems 18 such as the Motorola CyberWave™, allowing registration of cable modems from multiple vendors independent of whether the subscriber unit 16,18 accommodates the power management techniques discussed herein. As illustrated, the CMTS 28 includes software for communicating information through the distribution network 20 to the subscriber units 16,18 through bidirectional links 52 and 54 respectively. A virtual broadcast channel (VBC) 56 and a media gateway control protocol (MGCP) 58 communicate information to the distribution network 20 through an alert queue 60, discussed further in connection with FIG. 3. The VBC 56 sets up a bidirectional communications channel 62 through the alert queue 60 to broadcast control information in the system 10 for controlling the power or placing the subscriber units in a sleep mode, or the like. The MGCP facilitates a remote access server protocol on the CMTS 28 software for Registration, Admissions, and Status signaling similar to the same facilities provided by H.323. The MGCP 58 is typically employed in cable modem systems as a call agent or call management server, whereas H.323 is still used extensively in IP telephony. However, much of the technology is merging as IP telephony and cable distribution using cable modem technology merges. Accordingly, either the MGCP call agent or H.323 standard may be used to provide IP telephony communications across IP-based networks, such as the internet or a HFC distribution network.

Figure 3:
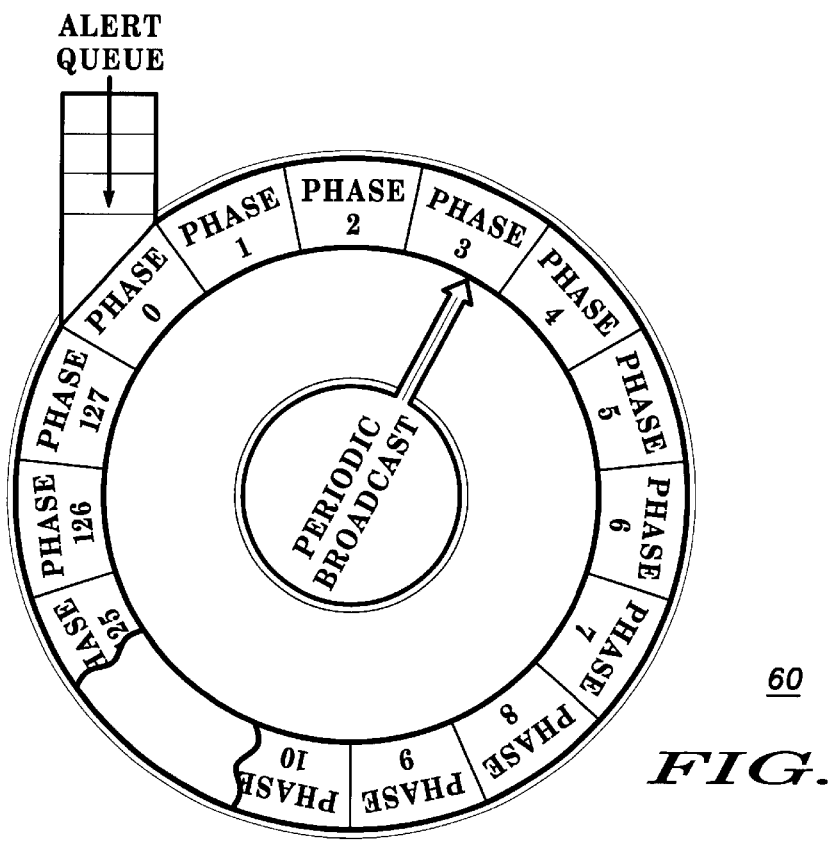
FIG. 3 illustrates the cable distribution network power control alert queue.

FIG. 3 illustrates the alert queue 60 which uses an alert phase method for sleep mode of the subscriber units 16 by partitioning the serving area into subnets and assigning the partition serving area phases of the alert queue; as shown, the alert queue 60 has 128 phases, i.e., phases 0–127, which is used with a timing clock represented by an arrow pointing to individual phases of the queue for periodic broadcast of information stored in memory buffers as messages are trapped and put in the alert queue 60. The timing clock typically has a period on the order of 10 milliseconds and switches phases in synchronization with an associated timing clock on the PCAU 16. Typically, a serving area 44 may include on the order of 600 homes or subscriber units which would be divided uniformly into and associated with the 128 bins or phases of the alert queue 60. An alert message is the first message which goes out to the subscriber units 16,18, when a telephone call is to be delivered and activated. Thus, the alert message is queued up for delivery at the intended time and interval of the periodic broadcast associated with the alert queue 60. Initially, at registration, the PCAUs 16 are arbitrarily assigned an alert phase, i.e., the IP telephony subscriber units are assigned a bin associated with the phases of the alert queue 60. The VBC 56 server software traps, e.g., Q.931 messages in the H.323 protocol, call setup messages for delivery to the subscriber units 16,18. The VBC 56 server may then send out periodic alert phase messages with the alert information for call setup. Accordingly, trapped messages are stored in the phases of the alert queue 60, and as the timing clock progresses for periodic broadcast from the queue, when messages are present in the respective phases, the messages are forwarded on to the subscriber units 16,18 in accordance with the periodic broadcast. Since the associated clock at the subscriber units 16,18 are in sync with the periodic broadcast timer clock of the alert queue, active subscriber units 16,18 associated with the current phase of the alert queue receive trapped messages from the alert queue. For example, when messages go out for, e.g., phase number 3, the transmission occurs at the same time at which all of the cable modems associated with phase number 3 are awake and ready to receive messages. The PCAU subscriber units wake up during their assigned phase, and are placed in a sleep mode during all other phases, and thus the subscriber units 16,18 are synchronized with the alert messages from the alert queue 60. If no message is present when a subscriber unit wakes up, the unit goes back to sleep until the next alert phase cycle. Accordingly, the network power of the distribution network 20 is load-leveled to maintain a power management level for distribution of power through the network. Since the network provides power to only a small group (subnet) at any instant in time, the overall power load is substantially reduced. The cycle time associated with the periodic broadcast is subnet programmable allowing modification of the number of bins or phases associated with the alert queue 60, to achieve a balance between response time versus power by varying the number of bins which defines the timing of the periodic broadcast from the alert queue 60.

Figure 4:
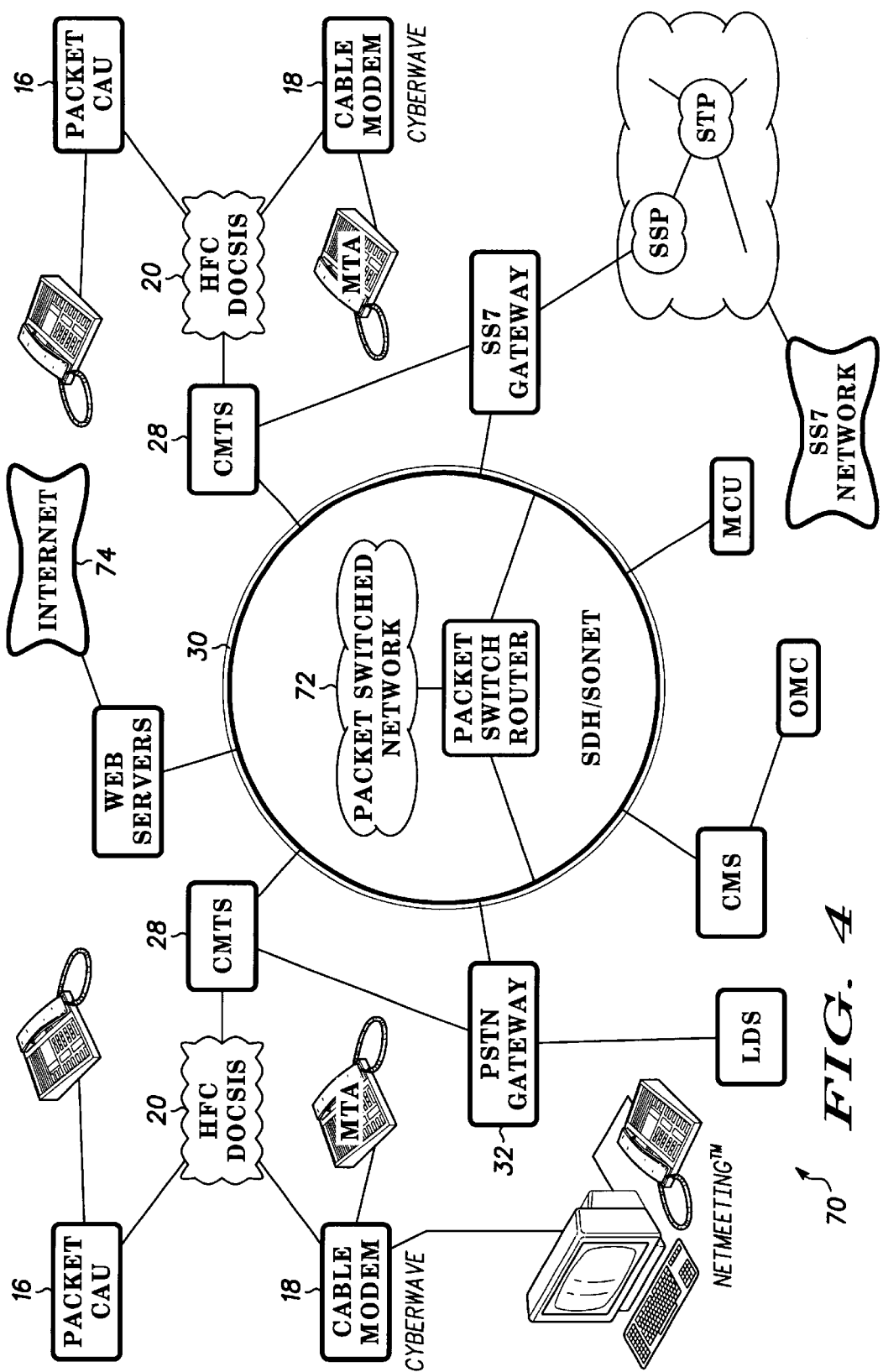
FIG. 4 illustrates the architecture of hybrid fiber coax (HFC) internet protocol IP telephony communications systems.

FIG. 4 illustrates the architecture of a typical HFC IP telephony communications system providing a high level representation in which multiple data communication protocols may be accommodated on the IP backbone 30. Herein, a packet switched network 72 is coupled to the backbone 30 by a packet switch router, and, e.g., the internet 74 may be accessed via web servers. As shown, several flexible network interfaces are provided, e.g., packet data, cable telephony, SST signaling, as well as the PSTN and the public internet. The IP data may be carried over a variety of networks such as asynchronous transfer mode (ATM), synchronous optical network (SONET), fiber distribution data interface (FDDI), as well as 100 Base-T Ethernet networks.

Figure 5:
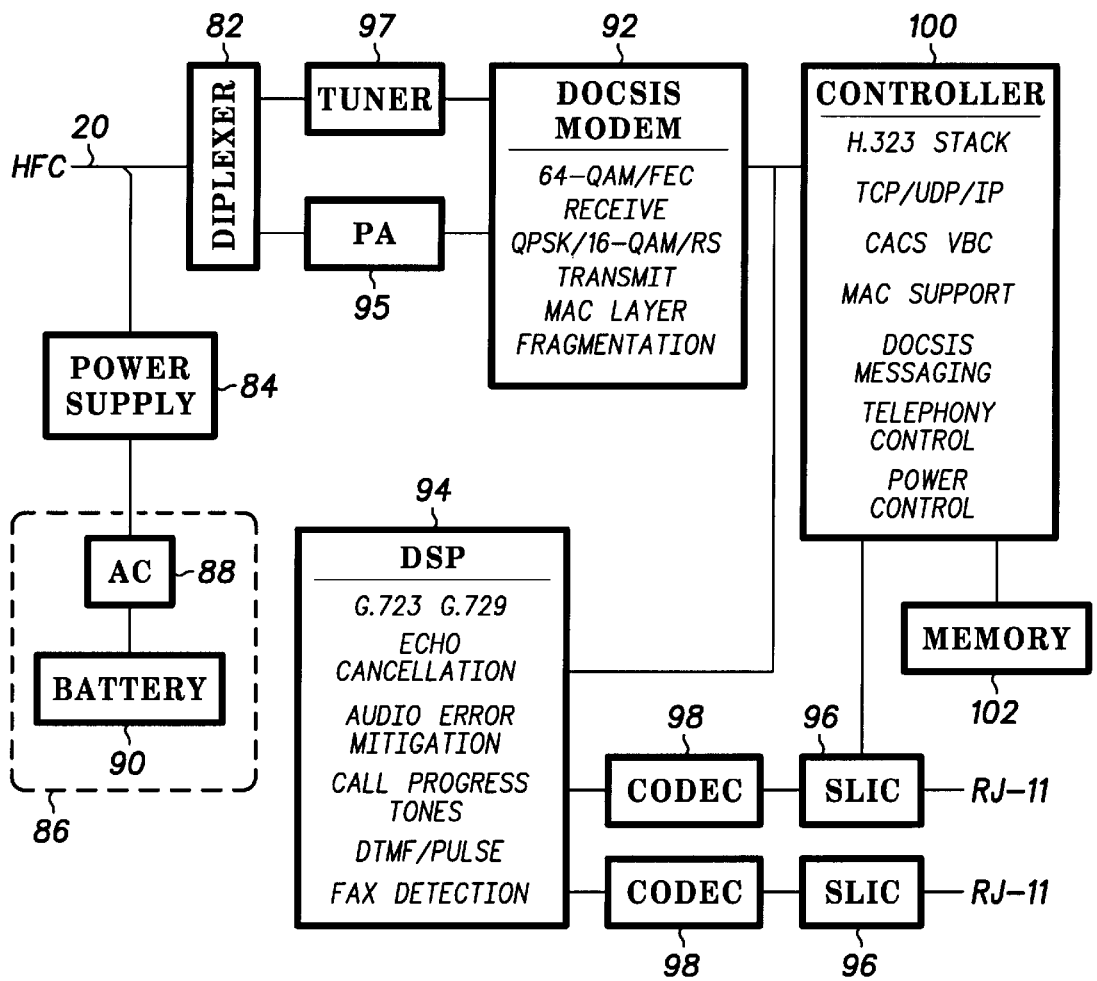
FIG. 5 is a schematic block diagram of a packet cable access unit (PCAU) architecture.

With reference to FIG. 5, the PCAU 16 DOCSIS architecture is shown in schematic block diagram form in which the HFC 20 distribution network provides RF signals to a diplexer 82, as well as having the capability for coupling network power to a regulated power supply 84. Alternatively, the regulated power supply 84 may receive premise power 86, as shown to provide an alternating current (AC) source 88 with a battery 90 backup power to provide continuous or lifeline service capabilities. The diplexer 82 provides a bidirectional communication path to a DOCSIS modem 92, via a tuner 97 and a power amplifier 95. In the described embodiment, the DOCSIS modem utilizes 64-QAM quadrature amplitude modulation with forward error correction (FEC) on the receive side, and transmits via quadrature phase shift keying (QPSK) or 16-QAM modulation DOCSIS provides a media access control (MAC) layer protocol, and fragmentation of the data packets to accommodate constant bit rate data used in telephony. The DOCSIS modem provides all of the physical layer functions for cable modem communication in the PCAU 16. Digital signal processing is provided below the DOCSIS modem 92, as illustrated in DSP block 94 which uses two Texas Instruments digital signal processors in the described embodiment to provide for four IP telephony channels. The DSP 94 utilizes two TI TMS320C53 digital signal processors which provide 100 MIPS of processing each for a total of 200 MIPS. The DSP 94 performs all of the voice band processing functions necessary for delivering speech over the packet network. To this end, DSP 94 performs echo cancellation, audio error migration, call progress tones, DTMF/pulse and fax tone detection, and audio compression and decompression algorithms such as G.723 and G.729. As shown, two channels are provided with RJ-11 access through subscriber line interface circuits 96 (SLIC) and analog/digital converters (CODEC) interfaced with the DSP 94. Although two channels are shown, the DSP 94 is capable of handling up to four simultaneous channels of voice, i.e., four phone lines with separate telephone numbers within the PCAU 16. A controller 100 herein provided as a microprocessor subsystem facilitates the IP software stack, as well as TCP/UDP and the VBC functions. The controller 100 performs the DOCSIS messaging functions with the DOCSIS modem 92 and is interfaced with the SLICs 96 for telephony control. The controller 100 also performs the basic power control operation for establishing active power on and sleep state conditions of the PCAU 16. A memory 102 is coupled to the controller 100 for program and data storage.

Figure 6:
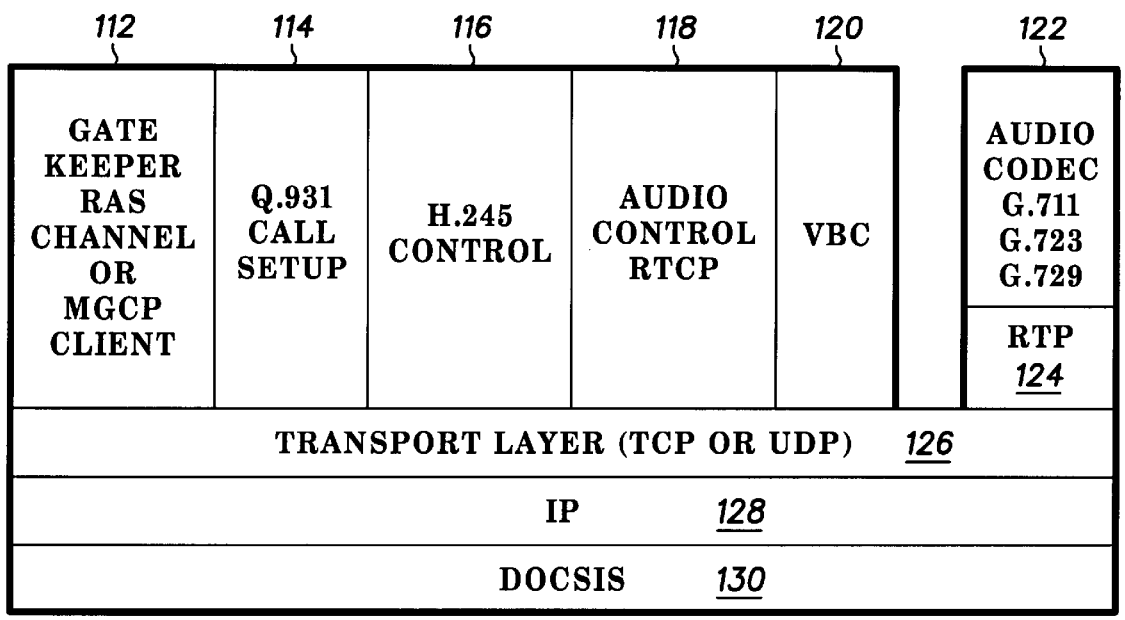
FIG. 6 shows the PCAU communications software stack.

The PCAU 16 software communication stack architecture is shown in FIG. 6 which includes gatekeeper 112 signaling functions for Registration, Authentication, and Status (RAS) which may be provided as H.323 for voice over internet protocol (VoIP) or MGCP for Media Access Gateway Protocol. The gatekeeper RAS channel function sits at the top of the software communications stack. The Q.931 call set up function 114 is used to initiate, supervise, and terminate telephone calls, which is provided as an industry standard messaging sequence. H.245 control 116 provides messaging sequencing as part of the H.323 communication stack operations. The real time control protocol 118 (RTCP) of the communication stack 110 is used for controlling audio packet data. The virtual broadcast channel (VBC) 120 provides software functionality for facilitating the VBC operation with the CMTS 28 as discussed above in connection with FIG. 2.

Audio CODEC 122 functions, e.g., G.711, G.723, G.729, e.g., 64 kbs, 16 kbs, and 8 kbs, provide audio compression and decompression and are embedded within a real time protocol (RTP) 124 layer for constant delivery of audio data packets for packing a predetermined number of bytes in a packet for constant time delivery. The next layer in the stack is the transport layer 126 which provides TCP/UDP functions over the internet protocol (IP) 128 function. At the lowest level of the PCAU communications stack 110 is the DOCSIS link and physical layer 130.

Figure 7:
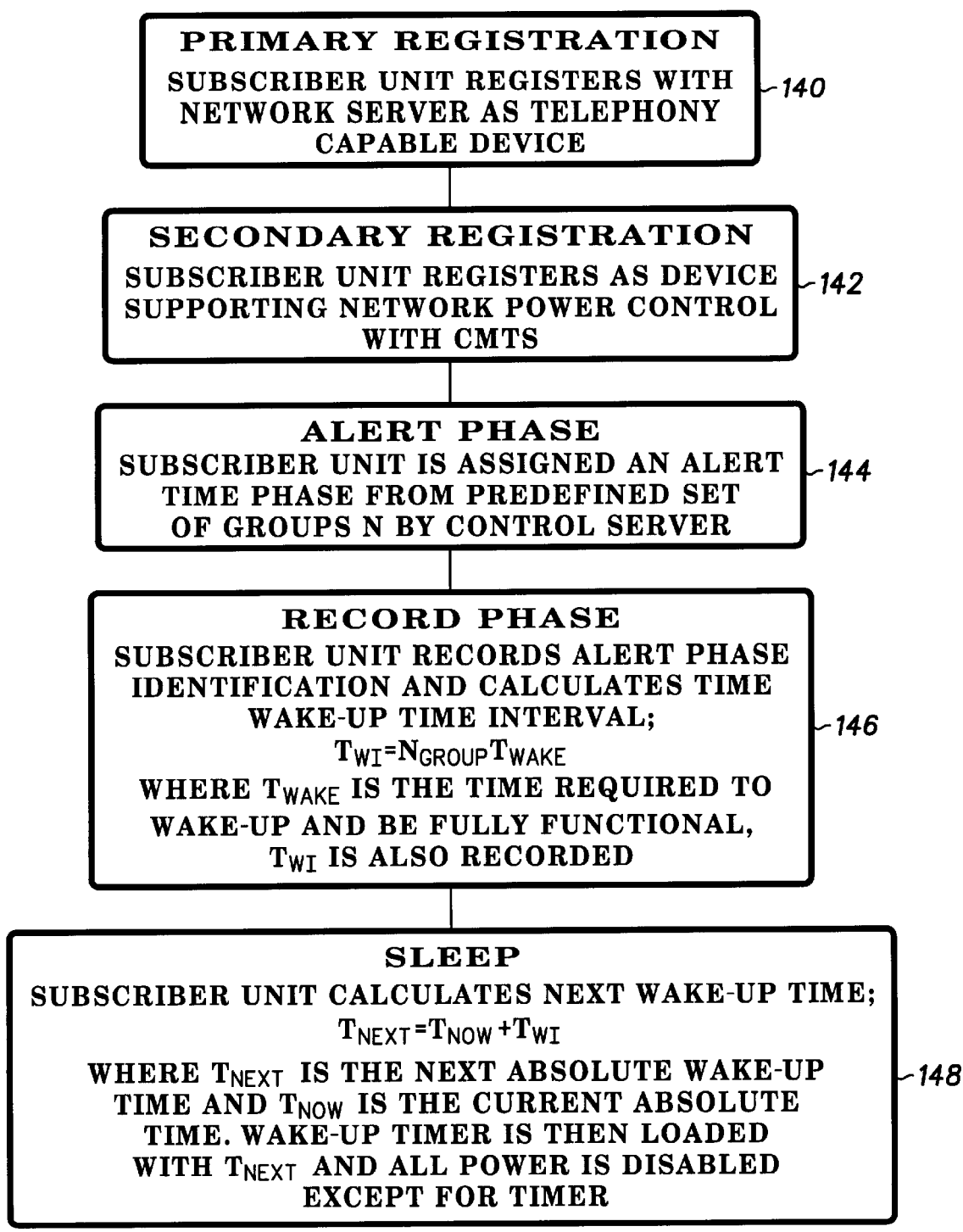
FIGS. 7, 8, and 9 are program flow charts of the processes employed by the subscriber and CMTS operating logic facilitating communication with the PCAU to access the communications system employing the cable distribution power control alert queue according to the present invention.
Figure 8:
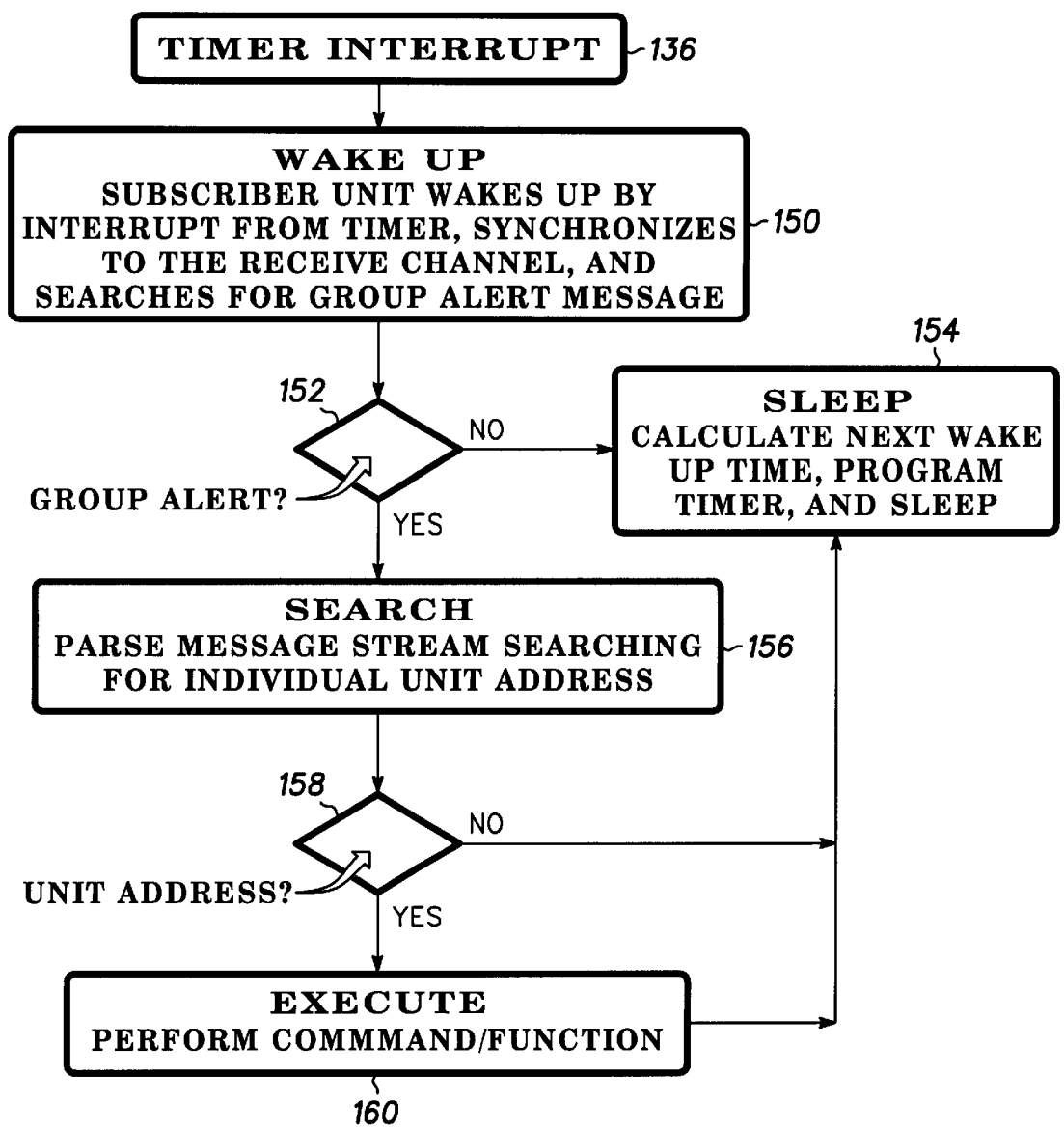

With reference to FIGS. 7 and 8, the PCAU subscriber power-up logic and operating logic are illustrated in program flow diagrams to facilitate operation with the alert queue 60 as illustrated above in connection with FIG. 3. The subscriber power-up logic flow chart 132 of FIG. 7 begins with the primary registration 140 which facilitates the PCAU subscriber unit registration with the network server of the communications system 10 to identify the PCAU 16 or desktop modem 18 as a telephony compatible device. A secondary registration 142 performed with the subscriber units 16,18 additionally registers the device as supporting network power control with the CMTS 28. Accordingly, if the PCAU 16 is capable of network power control, whereas the desktop modem 18 is not capable of such power control, then the secondary registration 142 is used to identify the subscriber unit's characteristics with respect to the power control for operation in connection with the overall system 10, as discussed above. An alert phase 144 is assigned to each subscriber unit, as discussed in connection with FIG. 3, to assign an alert time phase from a predefined set of groups N by the control server or VBC 56. Thus, after receiving a message containing the alert phase, the subscriber unit 16,18 records or stores the alert phase identification and calculates the wake up time interval, e.g., using the group number N and the time required to wake up and make the subscriber unit 16,18 fully functional, which defines the acceptable wake up time interval. The sleep time 148 is determined when the subscriber unit 16,18 calculates the next wake up time, wherein the next wake up time is the next absolute wake up time added to the current absolute time, i.e., the wake up timer is then loaded with the current absolute time, such that all power is disabled except for the timer in between the determined sleep 148 intervals.

With reference to FIG. 8, the subscriber operating logic 134 is described specifically in the program flow diagram which utilizes a timer interrupt 136 to enable the subscriber units 16,18 to wake up and interact with the CMTS 28 in accordance with the alert queue 60. Upon a timer interrupt 136, the subscriber unit processor executes a wake up 150, upon which the subscriber unit 16,18 wakes up via the interrupt from the timer, then synchronizes to the receive channel, and searches for a Group Alert message issued from the alert queue 60. At decision block 152, the subscriber unit determines whether a Group Alert message has been received, and if no Group Alert message has been received by the subscriber unit 16,18, then the subscriber unit is again placed into its sleep mode at block 154, and calculates the next wake up time for the program timer. If however a Group Alert is received as determined at decision block 154, a search 156 is employed to parse the message stream to search for individual unit addresses. If a unit address is found in the search block 156, the subscriber operating logic then executes a command or function which is performed at block 160. If a unit address is not identified at decision block 158, or upon the completion of the execute 160, the subscriber operating logic returns to sleep mode at block 154, and determines the next time for wake up in accordance with messages received from the alert queue 60. A Group Alert message is sent out by the alert queue 60 to indicate that one or more alert messages will follow. These messages may be sent on the same channel as the Group Alert channel or an alternate channel directed by the contents of the Group Alert message.

Figure 9:
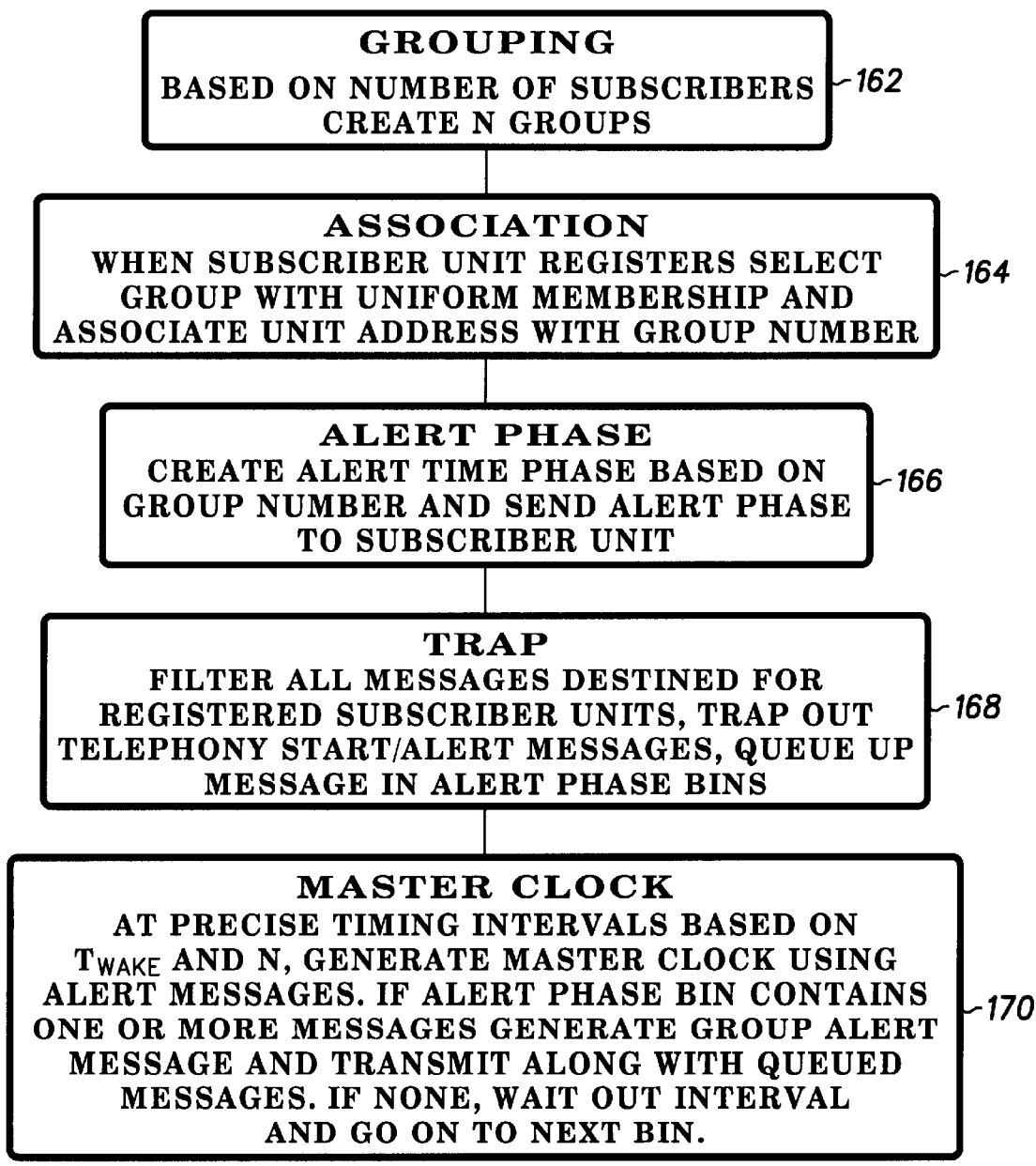

The CMTS operating logic is illustrated in FIG. 9 provided with the program flow diagram 138, from which the CMTS 28 creates a number of modem groups. Grouping performed at block 162 is performed based on the number of subscribers in order to create N groups, e.g., corresponding to phases 0–127, or 128 groups in the embodiment described in connection with the alert queue 160 and FIG. 3 above. An association is provided at block 164, in which the subscriber units 16,18 are assigned one of the created N groups with uniform membership and the Unit Address of the subscriber unit is associated with the group number for the subscriber units 16,18. The alert phase 166 as provided in accordance with the alert queue 60, creates an alert time phase based on the group number N, and then sends the alert phase to the subscriber unit 16,18. A trap 168 is provided in connection with the CMTS operating logic in order to filter all messages destined for registered subscriber units 16,18. The filtering operation provided by the trap 168 traps out telephony start/alert messages, and queues up such messages in the alert phase bins 0–127 of the alert queue 60. A master clock 170 is provided for the communication system 10 in order to provide precise timing intervals based on the wake times and the number of groups N, and thus master clock signals are generated using the alert messages. If the alert phase bin number contains one or more messages, a Group Alert message is transmitted to the subscriber units, which is received by the subscriber unit operating logic Group Alert decision block 152. The subscriber units 16,18 receive the queued messages from the CMTS 26, which are received for communication between the CMTS 26 and subscriber units 16,18. If no messages are contained in the present alert phase bin, however, then no Group Alert message is generated from the CMTS 28, and accordingly the alert queue 60 proceeds to the next phase bin in accordance with the master clock timing intervals.

While there has been described embodiments of the invention with respect to power distribution associated with POTS telephone units provided for IP telephony on a DOCSIS cable distribution system, it will be clear to one skilled in the art that the invention has applications beyond the cable distribution network environment. Accordingly, it is intended that the scope of the invention including such alternatives, modifications, and variations shall be defined by the appended claims.

What is claimed is:

1. A system for packet telephony power management of a cable distribution network for packet telephony information between multiple subscriber units communicated over a public switch telephone network, comprising:
    a communications network backbone;
    at least one router on said communications network backbone for sending and receiving signals between the public switch telephone network;
    an alert queue in communication with said at least one router, said alert queue being segmented into a plurality of phases for selective activation;
    memory buffers associated with each of the plurality of phases of said alert queue for buffering packet telephony information communicated via said router to a plurality of alert phase groups of the multiple subscriber units, each alert phase group being associated with one of the plurality of phases of said alert queue; and
    a virtual broadcast channel provided with said router to the multiple subscriber units for transmitting a control signal from said router to the multiple subscriber units.

2. A system as recited in claim 1 wherein said virtual broadcast channel sends messages received at said alert queue for periodic broadcast to selectively activated subscriber units to activate power to the multiple subscriber units in one of the alert phase groups which corresponds to the alert phase presently activated by said alert queue.

3. A system as recited in claim 2 comprising a timer for selective activation of the multiple subscriber units, synchronously with the selective activation of the plurality of phases of said alert queue.

4. A system as recited in claim 3 wherein the multiple subscriber units comprise a plurality of cable modems facilitating internet protocol telephony, said cable modems registering identification and configuration information with said router.

5. A system as recited in claim 4 wherein said cable modems register said identification and configuration information which indicate the ability of individual of said cable modems to operate in power saving modes for registering said individual cable modems as to whether power saving techniques may be employed via said virtual broadcast channel.

6. A system as recited in claim 1 wherein said at least one router comprises a cable modem termination system.

7. A system as recited in claim 1 wherein said alert queue facilitates asynchronous packet communications between said router and the multiple subscriber units.

8. A method of packet telephony power management of a cable distribution network for packet telephony information between multiple subscriber units communicated over a public switch telephone network with at least one router on a communications network backbone, said method comprising the steps of:
    establishing an alert queue segmented into a plurality of phases for selective activation, each phase having memory buffers for buffering packet telephony information communicated via the router;
    dividing the multiple subscriber units into a plurality of alert phase groups;
    associating each alert phase group with one of the plurality of phases of the alert queue; and
    providing a virtual broadcast channel between the router and the multiple subscriber units via the alert queue for communicating control signals.

9. A method as recited in claim 8 comprising the step of activating power to subscriber units divided into the plurality of alert phase groups according to the alert phase group associated with the current phase of the alert queue in response to control signals communicated over the virtual broadcast channel.

10. A method as recited in claim 9 wherein the step of activating power to the subscriber units further includes the step of monitoring the control signals in the alert phase.

11. A method as recited in claim 10 wherein the step of monitoring further includes the step of turning off the power to the subscriber units at the end of the alert phase.

12. A method as recited in claim 10 wherein the step of monitoring further includes the step of trapping control signals between the router and the multiple subscriber units with the alert queue to facilitate asynchronous packet communications between said router and the multiple subscriber units.

13. A method as recited in claim 8 wherein the virtual broadcast channel provided between the router and the multiple subscriber unit sends messages received at the alert queue for periodic broadcast to selectively activated subscriber units to increase power to the multiple subscriber units in one of the alert phase groups which corresponds to the alert phase presently activated by said alert queue.

14. A method as recited in claim 13 comprising the step of timing the selective activation of the multiple subscriber units synchronously with the selective activation of the plurality of phases of the alert queue.

15. A method as recited in claim 8 comprising the step of registering the multiple subscriber units which may comprise a plurality of different types of cable modems facilitating internet protocol telephony, said registering step providing identification and configuration information of the cable modems to the router.

16. A method as recited in claim 15 wherein the multiple subscriber unit cable modems register respective identification and configuration information which indicate the ability of individual subscriber units to operate in power saving modes, said registering step determining whether power saving techniques may be employed according to individual subscriber unit identification and configuration information received.

17. A system for packet telephony power management of a cable distribution network for packet telephony information between multiple subscriber units communicated over a public switch telephone network, comprising:

- means for communicating internet protocol information over a communications network backbone;
- means for routing information from said communicating means;
- means for establishing an alert queue segmented into a plurality of phases for selective activation, each phase having memory buffers for buffering packet telephony information received via said routing means;
- means for dividing the multiple subscriber units into a plurality of alert phase groups and associating each alert phase group with one of the plurality of phases of the alert queue; and
- means for providing a virtual broadcast channel over said routing means to the multiple subscriber unit using the means for establishing the alert queue for communicating control signals.

18. A system as recited in claim 17 wherein said means for providing the virtual broadcast channel sends messages received at the alert queue for periodic broadcast to selectively activated subscriber units to activate power to the multiple subscriber units in one of the alert phase groups which corresponds to the alert phase presently activated by the alert queue.

19. A system as recited in claim 18 comprising timing means for timing selective activation of the multiple subscriber units synchronously with selective activation of the plurality of phases of the alert queue.

20. A system as recited in claim 18 comprising means for dual registration of the multiple subscriber units which comprise a plurality facilitating internet protocol telephony, which cable modems register identification and configuration information with said routing means.

21. A system as recited in claim 17 wherein said means for establishing the alert queue facilitates asynchronous packet communications between said routing means and the multiple subscriber units.

22. A system as recited in claim 17 wherein said routing means comprises at least one cable modem termination system.

* * * * *